United States Patent
Barrere-Tricca et al.

(10) Patent No.: US 6,589,498 B1
(45) Date of Patent: Jul. 8, 2003

(54) PROCESS AND DEVICE FOR TREATING A GAS CONTAINING HYDROGEN SULFIDE, WITH RECYCLING OF THE REDUCED CATALYTIC SOLUTION

(75) Inventors: Cécile Barrere-Tricca, Paris (FR); Thierry Huard, Montrouge (FR); Christian Streicher, Rueil-Malmaison (FR)

(73) Assignee: Institut Francais du Petrole, Rueil-Malmaison cedex (FR)

( * ) Notice: Subject to any disclaimer, the term of this patent is extended or adjusted under 35 U.S.C. 154(b) by 446 days.

(21) Appl. No.: 09/589,744

(22) Filed: Jun. 9, 2000

(30) Foreign Application Priority Data

Jun. 10, 1999 (FR) .............................. N0 EN 99/07359

(51) Int. Cl.$^7$ ............................................. C01B 17/04
(52) U.S. Cl. ............................... 423/573.1; 423/576.2; 423/576.4; 423/576.5; 423/576.6
(58) Field of Search .......................... 423/573.1, 576.2, 423/576.4, 576.5, 576.6; 48/127.7, 198.3

(56) References Cited

U.S. PATENT DOCUMENTS

| | | | |
|---|---|---|---|
| 4,532,118 A | * 7/1985 | Tajiri et al. | 423/226 |
| 4,784,775 A | * 11/1988 | Hardison | 210/712 |
| 4,808,385 A | * 2/1989 | Grinstead | 423/226 |
| 4,859,436 A | * 8/1989 | Olson et al. | 423/221 |
| 5,753,189 A | * 5/1998 | Rehmat | 422/110 |

FOREIGN PATENT DOCUMENTS

| | | | |
|---|---|---|---|
| DE | 3444252 A1 | * 6/1985 | |
| WO | WO 92/17401 | * 10/1992 | |

OTHER PUBLICATIONS

Roger Grant et al. Grant and Hackh's Chemical Dictionary (5th Ed.) McGraw–Hill Book Co. U S A , ISBN 0–07–024067–1, p. 414, 1987.*

* cited by examiner

*Primary Examiner*—Stanley S. Silverman
*Assistant Examiner*—Timothy C. Vanoy
(74) *Attorney, Agent, or Firm*—Antonelli, Terry, Stout & Kraus, LLP

(57) ABSTRACT

A process intended for desulfurization of a gaseous feed containing hydrogen sulfide, includes at least the following stages: a) contacting the gaseous feed with a catalytic solution containing at least one polyvalent metal chelated by at least one chelating agent, under suitable conditions for oxidation of the hydrogen sulfide to elemental sulfur and concomitant reduction of the polyvalent metal from a higher oxidation level to a lower oxidation level, b) recovering on the one hand a gaseous effluent substantially freed from hydrogen sulfide and, on the other hand, the catalytic solution at least reduced and containing elemental sulfur, and c) recycling at least a fraction $F_1$ of the catalytic solution at least reduced and containing solid elemental sulfur to absorption stage a) so as to reduce the number of sulfur grains of very small size.

11 Claims, 2 Drawing Sheets

PROCESS AND DEVICE FOR TREATING A GAS CONTAINING HYDROGEN SULFIDE, WITH RECYCLING OF THE REDUCED CATALYTIC SOLUTION

FIELD OF THE INVENTION

The present invention relates to an improved process intended for desulfurization of a gaseous feed containing hydrogen sulfide in order to eliminate more readily the elementary sulfur contained in a catalytic desulfurization solution and formed by chemical oxidation reduction reaction after a contacting stage. At least part of the catalytic solution from the contacting stage, containing elemental sulfur, is therefore recycled to the absorption stage under selected conditions allowing to increase the average size of the sulfur grains and notably to reduce the number of sulfur grains of very small size.

The process according to the invention is notably applied in a <<Redox>> type process for desulfurizing a gas containing at least hydrogen sulfide, where the gaseous feed is contacted with a catalytic solution. The catalytic solution comprises for example a polyvalent metal chelated by at least one chelating agent under suitable conditions for oxidation of the hydrogen sulfide to elemental sulfur and simultaneous reduction of the chelated polyvalent metal from a higher oxidation level to a lower oxidation level. After the absorption stage, a gaseous effluent practically free of hydrogen sulfide is recovered on the one hand and the catalytic solution at least partly reduced and containing elemental sulfur as a suspended solid is recovered on the other hand. At least part of the catalytic solution is recycled for example to the absorption stage so as to increase the size of the sulfur particles. The non-recycled part of the catalytic solution containing the sulfur is freed from the most part of the sulfur present as a suspension during a separation stage, then it is sent to a regeneration stage, air regeneration for example, prior to being used in the absorption stage.

BACKGROUND OF THE INVENTION

The prior art describes many redox processes and associated devices allowing to eliminate hydrogen sulfide and to recover the elemental sulfur formed during the process.

The desulfurization process comprises for example the following two oxidation reduction stages:

during a first stage (absorption stage, oxidation reduction reaction), the hydrogen sulfide present in the gas to be processed reacts with chelated ferric ions according to the reaction:

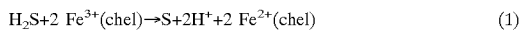

$$H_2S + 2\ Fe^{3+}(chel) \rightarrow S + 2H^+ + 2\ Fe^{2+}(chel) \quad (1)$$

The sulfur resulting from this chemical reaction has the form of grains of very small size. This sulfur is referred to as <<native sulfur>> in the description hereafter.

during a second stage (regeneration stage), the ferrous ions are reoxidized by the oxygen of air according to the reaction:

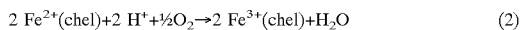

$$2\ Fe^{2+}(chel) + 2\ H^+ + \tfrac{1}{2}O_2 \rightarrow 2\ Fe^{3+}(chel) + H_2O \quad (2)$$

These stages are notably described in patents U.S. Pat. No. 5,753,189, U.S. Pat. No. 4,859,436 and U.S. Pat. No. 4,532,118, and in patent applications WO-92/17,401, DE-34 44,252, but none of these documents describes or suggests recycling part of the catalytic solution at least partly reduced and containing elemental sulfur to the absorber in order to decrease the quantity of (small-size) native sulfur in the catalytic solution to be purified and regenerated. In fact, patent U.S. Pat. No. 5,753,189 describes recycling of part of the reduced catalytic solution freed from sulfur in order to control the sulfur concentration in the absorption zone.

The aqueous catalytic solutions used are generally very poor sulfur solvents. The presence of native sulfur grains of very small size can therefore disturb the course of these processes.

The devices generally comprise sulfur separation equipments using mechanical processes such as filtration, decantation or centrifligation. Sulfur grains of very small size can disturb this separation, for example by generating frequent filter clogging.

Furthermore, when the gas to be desulfurized is under high pressure, the process generally comprises a stage of preliminary expansion of the catalytic solution containing the sulfur prior to air regeneration. This expansion leads to degassing of the solution, which causes foaming problems that can be amplified by the presence of sulfur grains of very small size.

On the other hand, when the stage of regeneration of the catalytic solution at least partly reduced is carried out by contacting with air at atmospheric pressure, and the sulfur is most often recovered by flotation and/or decantation, the presence of sulfur grains of very small size can reduce the efficiency of this recovery.

SUMMARY OF THE INVENTION

The object of the invention is a new approach consisting in reducing the number of sulfur grains of very small size at least after the absorption stage in order to overcome notably the aforementioned drawbacks of the prior art. In order to obtain this result, at least part of the catalytic solution at least partly reduced and containing elemental sulfur is used and recycled to the absorption stage.

The invention relates to an improved process intended for desulfurization of a gaseous feed containing hydrogen sulfide, comprising at least the following stages:

a) contacting the gaseous feed with a catalytic solution comprising at least one polyvalent metal chelated by at least one chelating agent, under suitable conditions for oxidation of the hydrogen sulfide to elemental sulfur and concomitant reduction of the polyvalent metal from a higher oxidation level to a lower oxidation level (absorption stage), b) recovering on the one hand a gaseous effluent substantially freed from hydrogen sulfide and, on the other hand, said catalytic solution at least reduced and containing elemental sulfur.

The process is characterized in that at least a fraction $F_1$ of said catalytic solution at least reduced and containing solid elementary sulfur is recycled to absorption stage a) in order to reduce the number of sulfur grains of very small size.

Fraction $F_1$ proper cannot correspond to the whole of the reduced catalytic solution coming from the contacting zone. This fraction $F_1$ contains sulfur whose grain size can be selected.

According to an embodiment, the grain size of the sulfur grains suspended in the catalytic solution at least reduced after stage a) is for example determined and the quantity of the recycled fraction $F_1$ of said solution is adjusted so as to maintain a particle grain size distribution within a given range.

The recycled quantity of the reduced catalytic solution containing the suspended sulfur can also be adjusted according to the quantity of sulfur in the feed. Generally, the larger the quantity of sulfur in the feed, the lower the recycle ratio. Advantageously, this recycled quantity containing the sulfur of selected grain size can represent between 1 and 95% by weight of the reduced solution, for example between 20 and 90%, preferably between 30 and 85% and more preferably between 50 and 80% by weight.

According to a feature of the process, the solid elemental sulfur is separated from the non-recycled fraction $F_2$ of the catalytic solution (stage c)).

According to another feature of the process:

c) said reduced catalytic solution depleted in sulfur and preferably substantially freed from all of the sulfur can be at least partly regenerated, d) at least part of the regenerated catalytic solution is recycled to a stage of contacting the regenerated solution with a gaseous feed consisting at least of hydrogen sulfide.

According to another feature, part of the reduced catalytic solution substantially freed from all of the sulfur can be recycled to contacting stage a).

According to an embodiment, the sulfur produced during separation stage c) can be washed with water in order to recover the catalytic solution imbibing it and the catalytic solution is processed by reverse osmosis in order to control the water content of said catalytic solution.

The sulfur produced during separation stage c) can be washed with water in order to recover the catalytic solution imbibing it and the catalytic solution can be processed by nofiltration in order to control the proportion of water and of ions of low molecular weight in the catalytic solution.

According to an embodiment, separation stage c) can be carried out by filtration and the grain size distribution range of the sulfur grains is selected according to the filtering means.

At least part of the reduced catalytic solution freed from the most part of the elemental sulfur and obtained after stage c) is expanded for example.

According to an embodiment, said reduced catalytic solution depleted in elemental sulfur, obtained after stage c), is fractionated into a fraction $F_4$ and a fraction $F_3$, and the non-expanded fraction $F_4$ is recycled to absorption stage a).

The potential of said partly reduced catalytic solution is for example measured before the fractionation stage and fractions $F_3$ and $F_4$ are determined, the quantity of said fractions is controlled so as to maintain the ratio of the ferric ions to the ferrous ions between 0.1 and 100, preferably between 0.5 and 20.

Separation stage c) is for example carried out at a pressure ranging between 0.1 and 20 MPa.

The invention also relates to a device intended for desulfurization of a gaseous feed containing at least hydrogen sulfide, said device comprising at least one enclosure for contacting said gaseous feed with a catalytic solution containing at least one polyvalent metal chelated by at least one chelating agent, under suitable conditions for oxidation of the hydrogen sulfide to elemental sulfur and concomitant reduction of the chelated polyvalent metal from a higher oxidation level to a lower oxidation level, means intended for discharge of the gas freed from the most part of the sulfur and means intended for discharge of a mixture comprising catalytic solution $F_0$ at least partly reduced and containing elemental sulfur grains.

The device is characterized in that it comprises at least one device for fractionating said solution $F_0$ into at least two fractions $F_1$ and $F_2$, means for recycling said fraction $F_1$ to the inlet of the contacting enclosure, means for controlling the grain size of the sulfur grains and means for controlling and/or regulating the quantity of fraction $F_1$ recycled.

It can comprise a device for separating the solid elemental sulfur from said reduced catalytic solution, a zone intended for regeneration of said reduced catalytic solution, said regeneration zone comprising means intended for delivery of a gas comprising oxygen.

It can also comprise at least one expansion means located after said separation device and a flash drum.

The process and the device according to the invention are applied to desulfurization of a natural gas.

The process according to the invention notably affords the following advantages:

it favours collection of the <<native>> sulfur formed during the absorption stage on the grains present in the recycled solution by aggregation or agglomeration, which reduces the number of small-size particles, it favours operation of the sulfur filter plant located downstream from the absorber, the particles having a larger size. The sulfur <<cakes>> formed on the filter being thicker, the frequency of the declogging operations is reduced or the installed filtering surface is reduced, it improves the filtering efficiency. The number of particles that can pass through the filtering surface is greatly reduced, notably at the beginning of the filtering operation when a precoat forms on the filtering surface, it therefore improves the catalytic solution regeneration efficiency.

The process according to the invention is for example applied for desulfurizating a natural gas, refinery gases such as hydrogen-rich gases circulating in hydrotreatment plants, coke-oven gases,etc.

BRIEF DESCRIPTION OF THE DRAWINGS

Other features and advantages of the invention will be clear from reading the description hereafter of non limitative embodiments of the process and of the associated device, with reference to the accompanying figures wherein.

DETAILED DESCRIPTION

In order to illustrate the stages of the process according to the invention, the description given hereafter relates to a, process intended for desulfurization of a gas containing at least hydrogen sulfide, wherein a catalytic solution containing at least one polyvalent metal chelated by at least one chelating agent, for example a chelated iron solution, is used in order to perform oxidation of the hydrogen sulfide to elemental sulfur and concomitant reduction of the chelated polyvalent metal from a higher oxidation level to a lower oxidation level. A gaseous effluent depleted in hydrogen sulfide is recovered on the one hand and the catalytic solution at least partly reduced and containing elemental sulfur as a suspended solid is recovered on the other hand.

After the oxidation reduction stage, the sulfer has the form of particles or grains of very small size.

Figure 1:
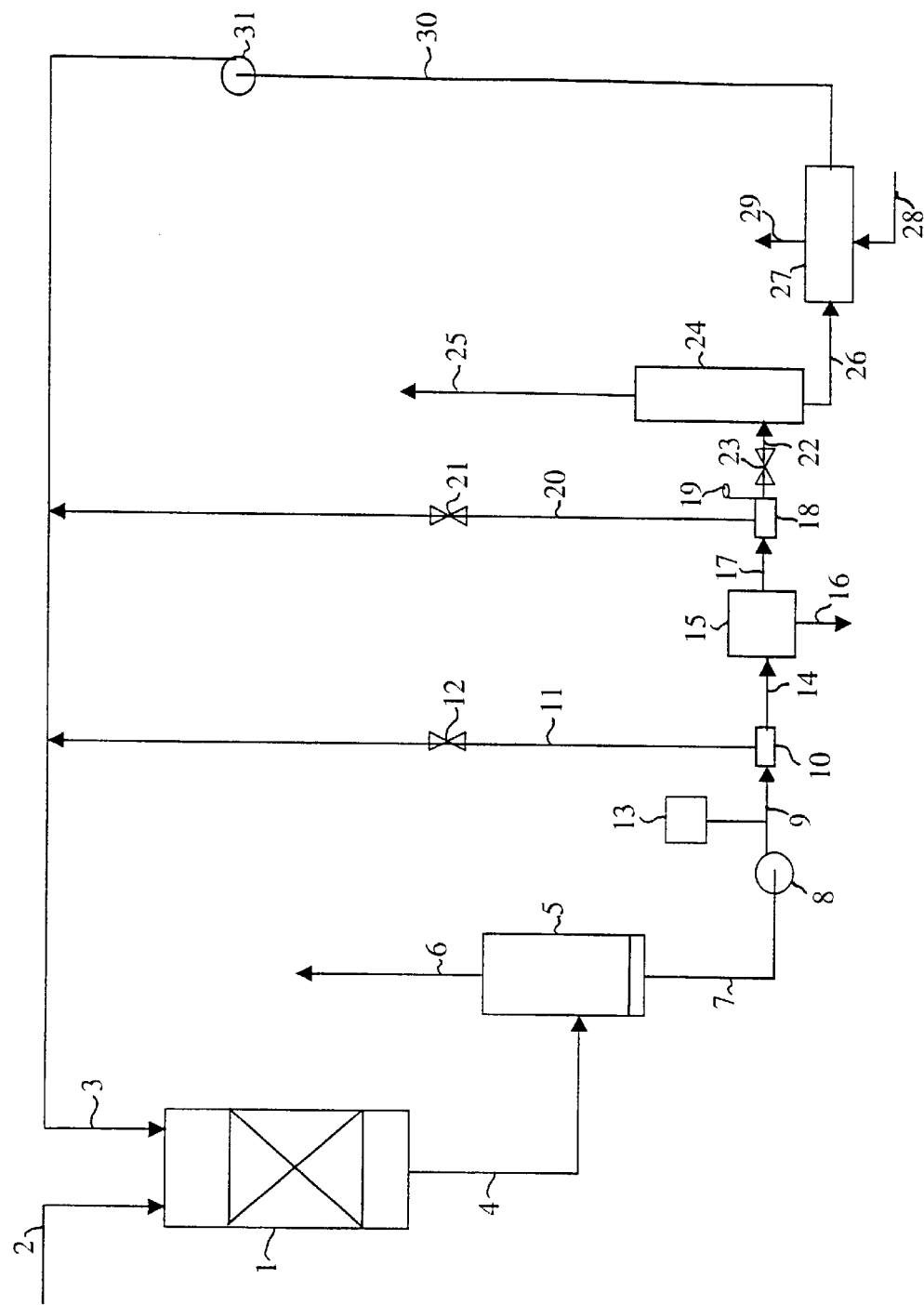
FIG. 1 diagrammatically shows an example of the device and of the method according to the invention.

The device for implementing the process according to the invention described in FIG. 1 comprises: an enclosure 1 for contacting the gas to be processed with the catalytic solution, or absorber, wherein oxidation reduction reaction (1)) takes place. The absorber is equipped with a line 2 intended for delivery of the gas to be processed, a line 3 intended for delivery of the catalytic solution, the two streams circulating for example cocurrent in absorber 1, and a line 4 intended for discharge of a mixture consisting of the catalytic solution at least partly reduced and containing suspended sulfur grains and a gas freed from most of the sulfur. The absorber is substantially at the pressure of the gas to be processed, which generally ranges between 0.1 and 20 MPa.

Line 4 is connected to a means such as a gas-liquid separation drum 5. This drum comprises, at the top thereof, a line 6 intended for discharge of the sulfur-freed gas and, at the bottom thereof, a line 7 intended for discharge of the catalytic solution at least partly reduced and containing suspended sulfur grains. This drum is at a pressure substantially equal to the pressure of the absorber. The solution is sent, by means of a pump 8 and through a line 9, to a device 10 such as a junction allowing to separate it into at least two fractions $F_1$ and $F_2$.

Fraction $F_1$ at least partly reduced and containing elemental sulfur is sent through a line 11 to the absorber and it is used to reduce the number of particles of very small size. Line 11 is equipped with a series of means 12 allowing control and regulation of the flow rate of fraction $F_1$, such as a valve and/or a flowmeter or any other suitable device. Means 13 allowing to know the grain size distribution of the sulfur suspended in the catalytic solution at least partly reduced are for example arranged upstream from junction 10. Means 13 can comprise one or more granulometers using ultrasounds or a laser technique.

Fraction $F_1$ can be mixed with fraction $F_4$ of the catalytic solution freed from sulfur and with fraction $F_3$ of the catalytic solution filtered and regenerated as mentioned hereafter.

Fraction $F_2$ is sent to the other stages of the process described in FIG. 1. This fraction $F_2$ is for example sent through a line 14 to an elemental sulfur separation device 15, for example a filter suited for separation at a pressure close to the pressure prevailing in the absorber.

The elemental sulfur is discharged through a line 16.

The catalytic solution at least reduced and freed from at least most of the sulfur is sent, through a line 17, to a device 18 where it is for example separated into two fractions $F_3$ and $F_4$. Device 18 can be equipped with a means 19 for measuring the potential of the catalytic solution at least partly reduced and freed from the most part of the sulfur so as to control and regulate the proportions of fractions $F_3$ and $F_4$, for example by acting on device 21.

The potential measuring means notably allows to control the value of the ratio of the ferric ions to the ferrous ions and to maintain this ratio between 0.1 and 100, preferably between 0.5 and 20.

Fraction $F_4$ is recycled through a line 20 equipped with a flow control and regulation device 21 such as a flow-control valve and a flowmeter at the absorber inlet.

Fraction $F_3$ is sent through a line 22 to an expansion means 23 such as a valve. Expansion produces degassing of the gases dissolved in the high-pressure solution. The mixture of catalytic solution at least partly reduced and at least expanded is fed into a flash drum 24. The gases produced during expansion are recovered at the top of the flash drum through a line 25. According to the type of gas processed, the gases can be light hydrocarbons, $CO_2$, hydrogen or organic sulfur compounds. The partly reduced and degassed catalytic solution is recovered at the bottom of the drum through a line 26.

It is sent through this line 26 to a regeneration zone 27.

The regeneration zone is for example provided with a line 28 intended for delivery of an oxidizing agent such as air, a line 29 intended for discharge of the excess air which has not reacted and a line 30 intended for discharge of the regenerated catalytic solution. The latter is for example pumped back by a pump 31 and recycled through line 3 to contacting enclosure 1.

Advantageously, separation of the sulfur under high pressure according to the process of the invention allows to prevent foaming problems that appear during sulfur recovery with the low-pressure processes of the prior art and clogging of the devices used for implementing the process.

The separation stage is for example carried out by means of a high-pressure filter as described in patent U.S. Pat. No. 5,435,911.

The device suited for sulfur separation comprises for example filter cartridges on which the elemental sulfur particles settle. It can comprise, for example, several filtering registers working alternately. The sulfur deposited is then recovered by declogging of the cartridges by means of a liquid (wet scaling) or gaseous (dry scaling) countercurrent. During the scaling operation, the register concerned does not fulfil the function of a filter and the solution continues being filtered on the other registers. The sulfur is recovered in form of a cake or of a concentrated solution.

The filtering device is selected for operation at a pressure value ranging between 0.1 and 20 MPa.

The idea of the invention notably consists in reducing the number of particles of very small size for example at the absorber outlet. The probability of encounter between the sulfur grains is therefore favoured by recycling fraction $F_1$ defined above to absorption stage (1).

The following stages are for example carried out:

determining or measuring the size of the sulfur grains at the absorber outlet, varying the flow rate of recycled fraction $F_1$ in order to keep a grain size distribution selected, for example, according to the quantity of $H_2S$ present in the feed, to the filter used and/or to the way the regeneration stage is carried out.

Figure 2:
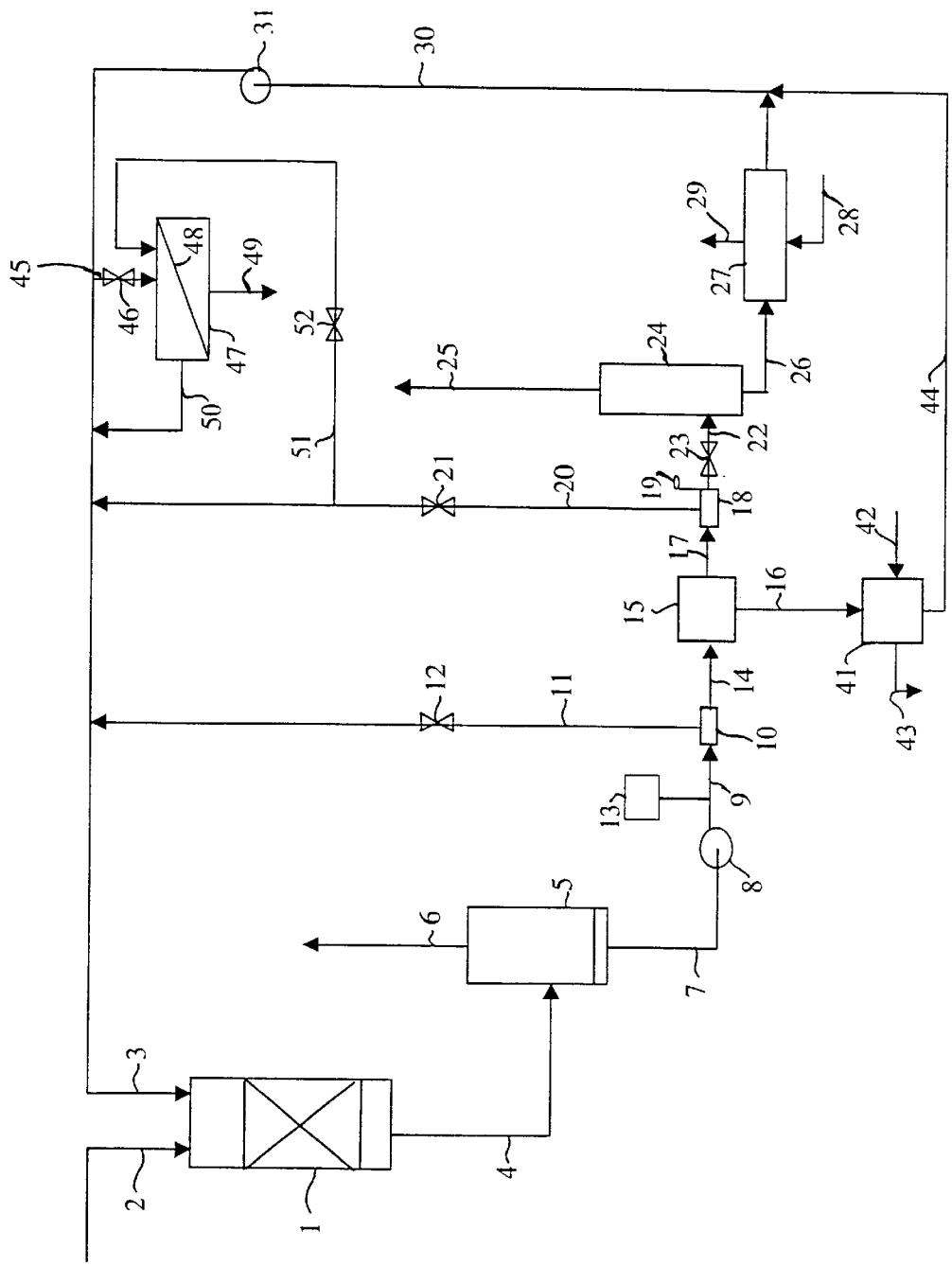
FIG. 2 shows a variant of the example described in FIG. 1 comprising an additional stage of water washing of the sulfur imbibed with the catalytic solution and of treatment of this catalytic solution.

FIG. 2 diagrammatically shows a variant of the process described in FIG. 1 wherein the sulfur produced after separation is washed with water, then the diluted catalytic solution is processed by reverse osmosis or nanofiltration.

After the separation stage, the sulfur produced is still imbibed with a large quantity of partly reduced catalytic solution (of the order of 20 to 50%).

If the gas to be processed is concentrated in hydrogen sulfide, a large quantity of sulfur can be produced and therefore leads to great catalytic solution losses. Furthermore, the catalytic solution contains ions of low molecular weight resulting from side reactions.

In order to limit catalytic solution losses with the sulfur produced, the latter is sent through a line 16 to a washing stage consisting for example of an equipment 41 intended for water washing of the sulfur and separation of the washed sulfur and of the diluted catalytic solution obtained after washing, a water inlet 42, a line 43 intended for discharge of the sulfur freed from at least part of the catalytic solution that imbibed it and a line 44 intended for discharge of the diluted catalytic solution. Said diluted catalytic solution is sent through line 44 to line 30. This diluted solution is sent, with the regenerated solution, to high-pressure pump 31 which recompresses them to a pressure substantially equal to the pressure of the absorber. At least part of this recompressed catalytic solution is sent for example to a treating device 47 through a line 45 equipped with a valve 46 allowing to control the fraction of the solution to be processed. Treatment is performed by reverse osmosis or nanofiltration. Treating device 47 comprises for example a membrane 48 allowing passage of only water molecules (reverse osmosis) or of water molecules and ions of low molecular weight resulting from side reactions (nanofiltration). Membrane 48 does not allow passage of the catalyst (polyvalent metal chelated by at least one chelating agent). Part of the water and possibly part of the ions from side reactions are discharged through a line 49 and the reconcentrated catalytic solution possibly freed from part of said ions is sent back through a line 50 to the absorption stage.

A possible partial bypass 51 equipped with a valve 52 allows to send a fraction of the filtered catalytic solution at least partly reduced to the reverse osmosis or nanofiltration treatment zone.

The driving force of a reverse osmosis or nanofiltration separation being the to pressure, a pump is generally placed before the membrane in order to compress the solution to be processed. Advantageously, according to the process of the invention, the catalytic solution being under pressure, it is useless to add a pump, which saves energy and investment.

Another advantage of this device is the fact that the presence of a reverse osmosis or nanofiltration stage allows to eliminate the excess water likely to accumulate in the plant and thus to control the catalyst content of the catalytic solution. Water appearances other than those due to washing of the sulfur, such as water formation by chemical reaction in the absorber or water of condensation, can thus be discharged by reverse osmosis or nanofiltration.

The device intended for sulfur washing and reverse osmosis or nanofiltration separation can also be used in other processes or with other equipments.

Without departing from the scope of the invention, the process according to the invention can also be applied in other processes or with other equipments.

EXAMPLE 1

Process According to a Pattern Without Recycling

A gas containing methane, 1% by volume of $CO_2$ and 16 ppm by volume of $H_2S$ is fed into absorber 1 through line 2 with a flow rate of the order of 1000 $Nm^3/h$.

It is contacted with an aqueous catalytic solution containing iron at a concentration of 0.25 mol/l and NTA at a concentration of 0.5 mol/l, the flow rate of the solution being 800 l/h.

The pressure inside the enclosure or absorber is 8 MPa, the temperature of the gas and of the catalytic solution is 20° C.

A cleaned gas containing less than 1 ppm $H_2S$ and a partly reduced catalytic solution containing elemental sulfur at a concentration of about 28 mg/l are recovered.

The catalytic solution is freed from the sulfur by passing through a filter having a filtering surface area of 0.06 $m^2$. The filter is declogged by countercurrent passage of the filtered catalytic solution when the pressure drop in the vicinity of the filter reaches 0.2 MPa, i.e. every 4 hours on average. The filtered catalytic solution is then separated into a fraction $F_4$ with a flow rate of 720 l/h, directly recycled to absorber 1, and into a fraction $F_3$ with a flow rate of 80 l/h which is sent, after expansion, to flash drum 24, then to air regeneration stage 27. The regenerated fraction is thereafter recycled to the absorber via pump 31. Air is sent at a flow rate of 1.1 $Nm^3/h$ to the regeneration stage.

The quantity of elemental sulfur produced is 22.8 g S/h.

Under such conditions, the $Fe^{3+}$ $Fe^{2+}$ ratio at the absorber outlet is about 12. The sulfur suspended in this solution $F_0$ has the form of grains whose average size is 10 $\mu$m. The grains consist of a cluster of crystallites whose size is of the order of 0.1 $\mu$m.

EXAMPLE 2

Implementation of the Process According to the Invention with Recycling of a Fraction of the Catalytic Solution in Order to Reduce the Number of Sulfur Grains of very Small Size A gas containing methane, 1% by volume of $CO_2$ and 16 ppm by volume of $H_2S$ is fed into the absorber through line 2 with a flow rate of the order of 1000 $Nm^3/h$.

It is contacted with an aqueous catalytic solution containing 86 mg/l suspended solid sulfur, iron at a concentration of 0.25 mol/l and NTA at a concentration of 0.5 mol/l, the flow rate of the solution being 800 l/h.

The pressure inside the absorber is 8 MPa, the temperature of the gas and of the catalytic solution is 20° C.

A cleaned gas containing less than 1 ppm $H_2S$ and a partly reduced catalytic solution $F_0$ containing elemental sulfur at a concentration of 114 mg/l are recovered.

This catalytic solution is separated into a fraction $F_1$ directly recycled to absorber 1 at a flow rate of 600 l/h and a fraction $F_2$ sent to a filter at a flow rate of 200 l/h.

The filter has a filtering surface area of 0.03 $m^2$. The filter is declogged by countercurrent passage of filtered catalytic solution when the pressure drop in the vicinity of the filter reaches 0.2 MPa, i.e. every 4 hours on average. The filtered catalytic solution is then separated into a major fraction $F_4$ with a flow rate of 120 l/h, directly recycled to absorber 1, and a minor fraction $F_3$ with a flow rate of 80 l/h, which is sent, after expansion, to flash drum 24, then to air regeneration stage 27 before recycling to absorber 1 via pump 31. The flow of air sent to the stage of regeneration of the catalytic solution is 1.1 $Nm^3/h$.

The total quantity of sulfur produced is 22.8 g S/h.

Under such conditions, the $Fe^{3+}/Fe^{2+}$ ratio at the absorber outlet is about 12 in catalytic solution $F_0$. The sulfur suspended in this solution is in form of grains whose average size is 16 $\mu$m, consisting of clusters of crystallites whose size is of the order of 0.1 $\mu$m.

It can thus be seen, in this example, that direct recycling before filtration of a fraction of the sulfur-containing catalytic solution allows, for the same flow of gas processed, the same total flow rate of solution fed into the absorber, the same filter declogging frequency and the same quantity of sulfur produced, to significantly increase the size of the sulfur grains and especially to reduce by a factor of 2 the installed filtering surface and therefore the cost of the filter.

Implementation of the process according to the invention is not limited to the examples given in FIGS. 1 and 2.

Without departing from the scope of the invention, the process according to the invention can be applied for high-pressure or low-pressure gases, the process pattern and the filtering means being adapted accordingly.

Contacting enclosure or absorber 1 comprises for example at least one reactor/contactor selected from the following list: reactor with stacked or random packing, static mixer, turbulent-jet impactor, hydro-ejectors, atomizer, wire contact or bubble column.

In case of cocurrent contact between the gas and the liquid, the cleaned gas and the partly reduced solution are separated in a separating drum before or after the elemental sulfur separation stage.

In the contacting enclosure, the gas to be processed can circulate countercurrent or cocurrent to the catalytic solution.

Recycling of the reduced solution containing the sulfur of selected grain size can be performed at the same point in the contacting zone or at different points.

The catalytic solution used can be aqueous solution, for example a chelated polyvalent metal solution, such as an aqueous solution of chelated iron produced for example from ferrous or ferric iron such as iron and ammonium or potassium sulfates, nitrates, thiosulfate, chloride, acetate, oxalate, phosphates, soluble salts, such as ferrous iron and ammonium sulfate, ferric ammonium oxalate, ferric potassium oxalate.

Chelating agents are for example used alone or in admixture, such as organic compounds known for their complexing properties, for example acetylacetone, citric acid, salicylic acid, sulfosalicylic acid, tiron (catechodisulfonic acid), dimercapto-2-3 propanol and aminoacids such as EDTA (ethylenediamine tetraacetic acid), HEDTA (hydroxy2ethylenediamine triacetic acid), NTA (nitrilotriacetic acid), DCTA (diamino1-2 cyclohexane tetraacetic acid), DPTA (diethylenetriamine pentaacetic acid), IDA (imonodiacetic acid).

an organic solution.

It is possible to use for example an organic solution consisting (i) of a solvent selected from the following products: N-methyl pyrrolidine, N-formylmorpholine, morpholine, dimethylsulfoxide, sulfolane, dimethylformamide, propylene carbonate, 1,4-dioxane, 4-hydroxy-4-methyl-2-pentanone, propylene glycol methyl ether, 2-butoxyethanol, 4-methyl-2-pentanone, 2,4-pentanedione, alone or in admixture, and (ii) of a chelated polyvalent metal of formula $ML_3$ where L is of $R_1COCH_2COR_2$ form with $R_1$ and $R_2$ selected from groups $CH_3$, $C_2H_5$, $C_6H_5$, $CF_3$, $C_4H_3S$, and M is a polyvalent metal existing in at least two oxidation states.

When an organic solution is used, the sulfur grains appear in the solution only after saturation of said solution by the dissolved sulfur.

Without departing from the scope of the invention, the regeneration stage is for example carried out by contacting the circulating catalytic solution with a gas containing oxygen, under suitable conditions for dispersion of the gas as very fine bubbles in the catalytic solution, by increasing the rate of circulation of said solution. A hydro-ejector can be used therefore.

The stage of regeneration of the catalytic solution with an oxidizing agent can also be carried out by using a gas-liquid contactor selected from the list mentioned for the absorption enclosure.

What is claimed is:

1. A process for desulfurization of a gaseous feed containing hydrogen sulfide, comprising at least the following stages:
    a) contacting the gaseous feed with a catalytic solution containing at least one polyvalent metal chelated by at least one chelating agent to oxidize the hydrogen sulfide to elemental sulfur and concomitantly reduce the polyvalent metal from a higher oxidation level to a lower oxidation level in an absorption stage,
    b) recovering a gaseous effluent substantially freed from hydrogen sulfide and said catalytic solution at least reduced and containing elemental sulfur, wherein at least a fraction $F_1$ of said catalytic solution at least reduced and containing solid elemental sulfur is recycled to the absorption stage a), and wherein the grain size of the sulfur grains suspended in the catalytic solution at least reduced after stage a) is determined and the quantity of recycled fraction $F_1$ of said solution is adjusted so as to maintain a desired grain size distribution of the particles.

2. A process as claimed in claim 1, wherein, in a stage c), the solid elemental sulfur is separated from a non-recycled fraction $F_2$ of the catalytic solution.

3. A process as claimed in claim 2, wherein at least a fraction of said non-recycled fraction $F_2$ from which said solid elemental sulfur has been separated in stage c) is at least partly regenerated, and at least part of the regenerated catalytic solution is recycled to a stage of contacting the regenerated solution with a gaseous feed consisting at least of hydrogen sulfide.

4. A process as claimed in claim 2, wherein the sulfur produced during separation stage c) is washed with water in order to recover the catalytic solution imbibing it and the catalytic solution is processed by reverse osmosis in order to control the water content of said catalytic solution.

5. A process as claimed in claim 2, wherein the sulfur produced during separation stage c) is washed with water in order to recover the catalytic solution imbibing it and the catalytic solution is processed by nanofiltration in order to control the proportion of at least water in the catalytic solution.

6. A process as claimed in claim 2, wherein separation stage c) is carried out by filtration and the grain size distribution range of the sulfur grains is selected according to the filtering means.

7. A process as claimed in claim 2, wherein at least part of the reduced catalytic solution freed from most of the elemental sulfur, obtained in stage c), is expanded.

8. A process as claimed in claim 2, wherein said reduced catalytic solution depleted in elementary sulfur from stage c) is fractionated into a fraction $F_4$ and a fraction $F_3$, fraction $F_3$ is expanded and non-expanded fraction $F_4$ is recycled to (absorption stage a).

9. A process as claimed in claim 8, further comprising measuring a potential of said reduced catalytic solution freed from most of the elemental sulfur obtained in stage c) prior to the fractionation stage, and controlling the quantity of said fractions $F_3$ and $F_4$ in order to maintain the ratio of the ferric ions to the ferrous ions between 0.1 and 100.

10. A process as claimed in claim 8, further comprising measuring a potential of said reduced catalytic solution freed from most of the elemental sulfur obtained in stage c) prior to the fractionation stage, and controlling the quantity of said fractions $F_3$ and $F_4$ in order to maintain the ratio of the ferric ions to the ferrous ions between 0.5 and 20.

11. A process as claimed in claim 1, wherein said gaseous feed containing hydrogen sulfide is natural gas.

* * * * *